3,091,557
METHOD OF CLEANING VULCANIZING MOULDS FOR THE MANUFACTURE OF RUBBER OBJECTS
Wilhelmus Adrianus Aloysius Heijmans and Carolus Gerardus Venis, both of Eindhoven, Netherlands, assignors to North American Philips Company, Inc., New York, N.Y., a corporation of Delaware
No Drawing. Filed Dec. 19, 1960, Ser. No. 76,474
Claims priority, application Netherlands Dec. 17, 1959
5 Claims. (Cl. 134—1)

This invention relates to methods of cleaning vulcanizing moulds for the manufacture of rubber objects, wherein after removal of the object a small proportion of the rubber adheres to the vulcanizing mould.

The term "rubber" is to be understood herein to mean both natural rubber and synthetic rubber.

Such vulcanizing moulds are used for the manufacture of tires, shoe-soles, etc. Such moulds are used, for example for the manufacture of bicycle tires, several hundred times before one proceeds to cleaning. After each vulcanizing of a tire, a rubber film remains on the outer wall of the mould so that, after several hundreds of tires, the profile of the mould has changed to an extent such that good quality of the tire is endangered.

In the method hitherto known, the mould is cleaned by subjecting it to the action of a chemical liquid for a long period, for example for 24 hours, so that the adhered rubber softens, followed by mud blasting for, for example, 3 hours. It will be evident that such a process is not particularly economical, since the vulcanizing mould is out of use for a long period. In addition, for this reason, the cleaning process takes place only when the profile of the object no longer has the desired sharpness. Consequently, the rubber objects vulcanized initially have a profile better than that of later objects, resulting in differences in quality.

Furthermore, the inner wall of a vulcanizing mould which is to be cleaned becomes somewhat rough due to the mud blasting process, which is not beneficial to the quality of the profile and results in the rubber adhering more readily in further use, so that the frequency of the prolonged cleaning must be raised more and more, resulting the length of life of the expensive moulds being shortened.

These disadvantages are mitigated by the invention, if not eliminated completely.

According to the invention, at least the inner wall of the mould is heated for so long a time and to so high a temperature that the rubber which has remained dissociates at least in part, whereupon the mould is subjected to an ultrasonic cleaning treatment in a liquid.

Due to the partial dissociation of the rubber at the surface of adhesion of the mould, an initial carbonization of the rubber occurs while evolving gas resulting in the formation of bubbles, due to which the rubber partially loosens and hardens at the surface of adhesion so that the residual rubber is readily removed by the ultrasonic treatment.

The total duration of the treatment is considerably shortened by this process, while the profile of the mould is not damaged and the length of life is increased. Due to its short duration, the cleaning process may be carried out more frequently, which is beneficial to the quality of the profile of the product, while a saving in the number of the expensive moulds may be obtained.

During test highly satisfactory results were obtained at heating temperatures of from 300° to 500° C. Such temperatures may be obtained, for example, in an oven or by the use of gas flames externally of the mould.

However, the mould is preferably high-frequency heated by inductive means, so that not only the period of heating is very short, but also the desired heating is effected at the inner wall at the surface of adhesion between the metal and the rubber due to the skin effect. Heating of the complete mould is thus not necessary and any risks of deformation are avoided, while the consumption of energy is small.

Such a method affords the advantage that, if according to another feature of the invention, the ultrasonic cleaning is effected in water having preferably a wetting agent or detergent, added to it, the temperature is still high enough for producing vapor, due to which the rubber which has dissociated at least in part, loosens more readily.

The use of a wetting agent serves to make the contact surface between the water and the rubber particles as large as possible, so that the ultrasonic treatment is more effective. For a continuous treatment for cleaning an annular mould of the kind comprising three parts (running surface and two side flanges) such as used, for example, for bicycle tires, it is preferable to carry out the ultrasonic cleaning treatment immediately after the high-frequency heating, the procedure of the two treatments being most economical by a progressive system. A continuous process also affords the advantages known per se for cleaning other moulds, for example shoe-sole moulds.

For further explanation we may mention on the ground of a method carried out in practice that, when the rubber residues are heated at a temperature of 175°, a certain carbonization of the rubber occurs, but the duration of the process then is uneconomically long. Afterwards the heating process was carried out at a temperature of 300° C., which resulted in a much shorter duration thereof. The required heating period of the moulds is determined by a change in structure of the rubber which becomes manifest by the formation of bubbles.

The heating time in the high-frequency coil and also the period of the ultrasonic treatment is of the order of 2 minutes per mould section or part. Following the high-frequency heating, the moulds are immersed in an ultrasonic bath filled with water, and if desired with chemical additions at room temperature.

The required power for carrying out this treatment is of the order of 1 watt per square cm. of basic surface of the tank with a frequency 40 kilocycles/sec.

The invention also relates to a high-frequency heating device which technologically forms a unit with the ultrasonic device.

It is to be noted that for vulcanizing bicycle tires use is made of moulds of steel having a low content of carbon.

What is claimed is:

1. A method of cleaning metallic vulcanizing molds for rubber products comprising heating the inner wall of said mold for a period of time and at a temperature so that any rubber that has adhered to the mold at least partly dissociates therefrom, and further supplying water to said mold and subjecting said mold to an ultrasonic cleaning treatment in said water while said mold is still hot.

2. A method of cleaning metallic vulcanizing molds for rubber products as claimed in claim 1 wherein said mold is heated by high frequency inductive means.

3. A method of cleaning metallic vulcanizing molds for rubber products comprising heating the inner wall of said mold for a period of time and at a temperature so that any rubber that has adhered to the mold at least partly dissociates therefrom, and further supplying water to said mold mixed with a wetting agent and subjecting said mold to an ultrasonic cleaning treatment in said water while said mold is still hot.

4. A method of cleaning metallic vulcanizing molds for rubber products as claimed in claim 1 wherein said ultrasonic cleaning takes place while said mold has a temperature sufficiently high to permit the development of vapor.

5. A method of cleaning metallic vulcanizing molds as claimed in claim 1 wherein said ultrasonic cleaning treatment immediately follows said heating process.

References Cited in the file of this patent

UNITED STATES PATENTS

| | | |
|---|---|---|
| 2,223,362 | Federman | Dec. 3, 1940 |
| 2,291,862 | Bailey | Aug. 4, 1942 |
| 2,894,860 | Engelhardt | July 14, 1959 |